United States Patent [19]
Taylor

[11] Patent Number: 5,347,576
[45] Date of Patent: Sep. 13, 1994

[54] LINE INTERFACE UNIT RETROFIT CIRCUIT

[75] Inventor: Steven C. Taylor, Hillsborough, Calif.

[73] Assignee: Verilink Corporation, San Jose, Calif.

[21] Appl. No.: 744,576

[22] Filed: Aug. 15, 1991

[51] Int. Cl.$^5$ .............................................. H03K 5/00
[52] U.S. Cl. ................... 379/399; 379/386; 370/13; 370/99; 370/110.1; 328/133
[58] Field of Search ...................... 379/399, 372, 386; 370/13, 14, 17, 110.1, 99; 307/350, 355, 360, 362; 328/132, 133, 146

[56] References Cited
U.S. PATENT DOCUMENTS

| | | | |
|---|---|---|---|
| 4,147,941 | 4/1979 | Curtice | 328/133 |
| 4,488,295 | 12/1984 | Sharper | 370/99 |
| 4,835,422 | 5/1989 | Dike et al. | 328/133 |
| 4,901,026 | 2/1990 | Phillips et al. | 328/133 |
| 5,051,614 | 9/1991 | Ohta | 307/350 |
| 5,051,628 | 9/1991 | Hanna | 307/355 |
| 5,063,564 | 11/1991 | Crandall et al. | 370/105.1 |
| 5,166,925 | 11/1992 | Ward | 370/13 |

Primary Examiner—James L. Dwyer
Assistant Examiner—M. Shehata
Attorney, Agent, or Firm—David Newman & Associates

[57] ABSTRACT

A retrofit circuit for communication one of three conditions from a line interface unit (LIU) to a receiver unit (RU), using only one external connection between the LIU and the RU. The LIU has a detection circuit and two resistors. The RU has a voltage comparator. The detection circuit outputs a first input signal in response to a signal having ESF and no yellow alarm, a second input signal in response to a signal having ESF and yellow alarm, a third input signal in response to a signal having SF with no yellow alarm, and a fourth input signal in response to a signal having SF with yellow alarm. The resistors output to the external connection a first voltage level in response to the first and third input signals, a second voltage level in response to the second and third input signals, and a third voltage level in response to the second and fourth input signals. The voltage comparator outputs a first output signal and a third output signal in response to detecting the first voltage level at the external connection, a second output signal and a third output signal in response to detecting the second voltage level at the external connection, and a second output signal and a fourth output signal in response to detecting the third voltage level at the external connection.

5 Claims, 5 Drawing Sheets

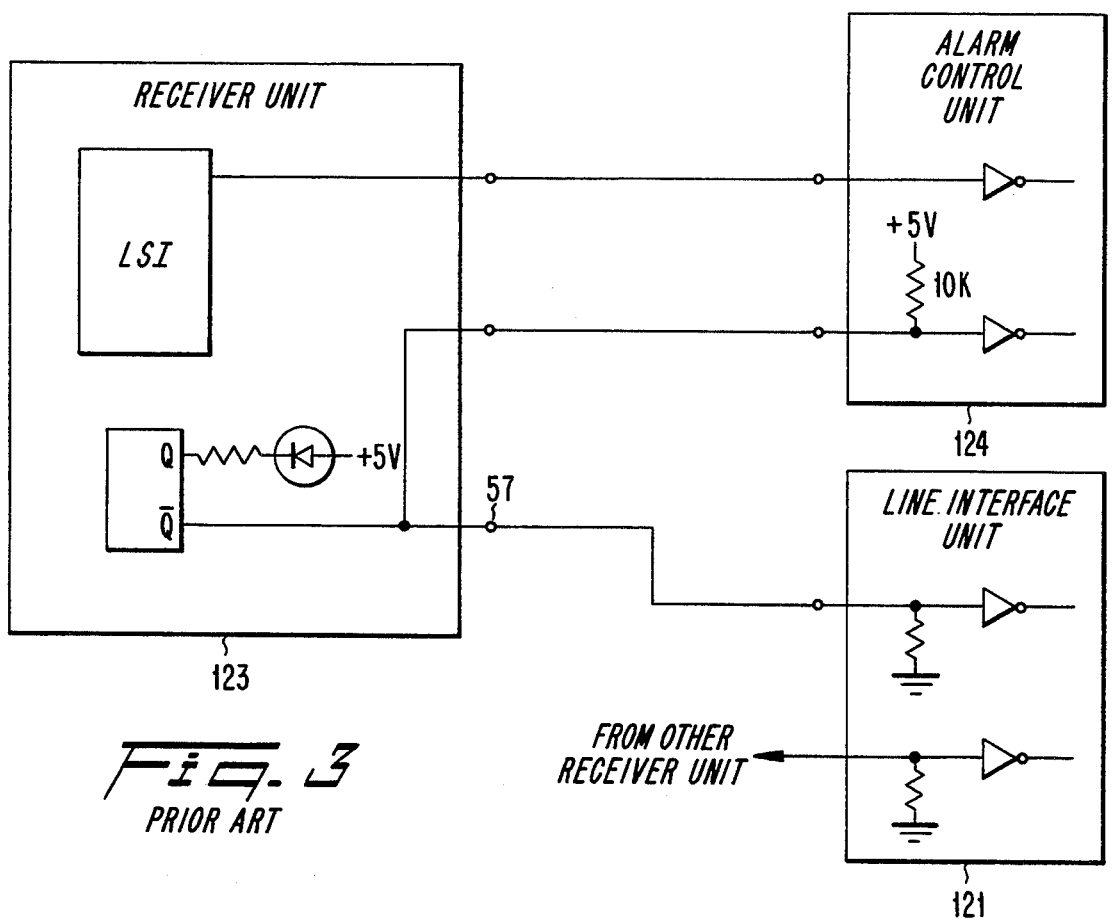
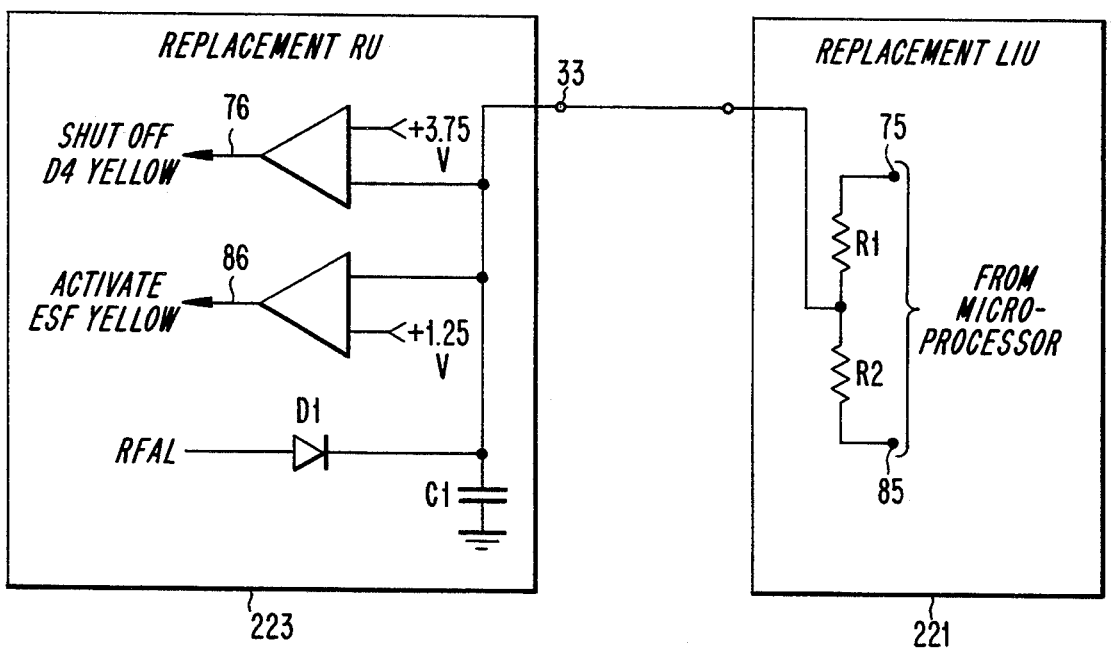

Fig. 6

| INPUT | A | B | C | D | CONDITION |
|---|---|---|---|---|---|
| +5V | OPEN | $\overline{RNB2}$ | OPEN | RNB2 | SF (OUTPUT=RNB2) |
| +2.5V | GND | OPEN | OPEN | GND | ESF (OUTPUT=0) |
| 0V | GND | OPEN | GND | OPEN | EY (OUTPUT=+5) |

Fig. 8

| STATUS | INPUTS | | COMPARATOR STATES | | | | RESULT |
|---|---|---|---|---|---|---|---|
| | RFAL | CONTROL | A | B | C | D | OUTPUT TO ACU |
| D4 MODE | 0 | 0V | $\overline{RNB2}$ | OPEN | RNB2 | OPEN | RNB2 (NORMAL D4 MODE) |
| ESF YELLOW | 0 | +2.5V | $\overline{RNB2}$ | GND | OPEN | OPEN | +5V = YELLOW ALM (ESF) |
| ESF NORMAL | 0 | +5V | $\overline{RNB2}$ | GND | OPEN | GND | 0V = NO YELLOW ALM (ESF) |
| RFAL | 1 | +4.3V (FORCED) | $\overline{RNB2}$ | GND | OPEN | GND | 0V = NO YELLOW ALM AND +5V(RFAL) TO LIU AND ACU |

LINE INTERFACE UNIT RETROFIT CIRCUIT

BACKGROUND OF THE INVENTION

This invention relates to Time Division Multiplex (TDM) Digital Channel Banks and more particularly to a retrofit, embodied as a retrofit circuit, to a receiver unit and line interface unit.

DESCRIPTION OF THE PRIOR ART

Telephone systems for communicating over the T1 network typically require a TDM channel bank for multiplexing. In the prior art, as illustrated in FIG. 1, a telephone 101 or modem was connected to a channel unit 102, which may be one of several in the channel bank. The channel unit 102 samples the telephone signal at eight thousand samples per second, and outputs the signal with pulse amplitude modulation (PAM). A channel bank 103, using the superframe format, time division multiplexes the PAM signals from the channel units, and converts the multiplexed signals to pulse code modulation (PCM), using the eight kilobits per second sample. Each sample is encoded into an eight bit byte. The channels are interleaved usually with eight bits per channel, and constitute one frame. A framing bit F is added to each frame of the channels, into what is known as the framing channel. Accordingly, an entire frame comprises 193 bits, $8 \times 24 + 1 = 193$ in the case of twenty-four, with 8 bit channels. For the digital network, each bit is transmitted at 8 kHz, yielding a data rate of 1.544 Mbs out of channel bank 103. The framing bits are a repetitive distinct pattern in the 193$d$ bit location of a frame. By detecting the location of the framing bits, the channels of PCM can be located and demultiplexed. Methods and apparatus for performing the detection and synchronization of framing bits are well known in the art.

A requirement for telephone lines, called "signalling", is a path for low speed data such as ringing, answer, start billing, etc. For example, on the early North American digital formats, of the eight bits per channel, the most significant seven bits were for data, which typically were digitized voice, and the eighth bit, which was the least significant bit, was for signalling. This format was of less than optimum quality for voice and restricted data to 56 kbps per channel.

An improvement was made with the current format by using eight bits per channel for data, for every first five consecutive frames. In every sixth frame, one bit per channel, the least significant bit, of the twenty-four channels was used as the signalling channel. Thus, in every sixth frame, each channel had only seven bits. This method of signalling was known as "robbed-bit" signalling. A restriction of 56 kbps for data also still existed but voice quality is much improved.

With earlier formats, location of the framing bits and the frame being used for the signalling bits has to be determined. The solution to this problem was to interleave the framing bit pattern of 1-bits and 0-bits, with another distinct pattern. The pattern chosen for the superframe (SF) format is the following sequence of bits:

001110

When this pattern was interleaved with the framing bit pattern the result is a superframe bit pattern with the following framing bits if the framing pattern is alternate ones and zeros:

100011011100

Bits from this pattern of twelve framing bits sequentially were placed in the 193$d$ bit location of a frame. Accordingly, the alternating 1-bit and 0-bit pattern occurs every 386 bits, instead of 193 bits. At the same time, this framing bit pattern allows a user to locate the frames with the signalling bits. The aggregate of twelve frames is known as a superframe. Framing patterns occasionally can be emulated by signal bits causing false framing at the receiver.

The extended superframe format (ESF) was developed, using the framing bits, 001011, as the superframe bit pattern, but now over twenty-four framing bits. For the ESF, the actual frame bit is one out of four bits in the framing bit location. A second bit of four framing bits is used for a cyclic redundancy check (CRC-6 is used for T1) and the remaining two bits out of four bits are used for a maintenance data link or embedded operations channel (EOC). The actual sequence of bits for ESF, with C representing a cyclic-redundancy-code bit and M representing a data-link bit, is the following bit pattern:

MCM0MCM0MCM1MCM0MCM1MCM1

Bits from this pattern of framing bits sequentially were placed in the framing channel, the 193$d$ bit location of a frame. Of the bits located in the 193$d$ bit location, 2 kHz are for framing, 2 kHz are for CRC, and 4 kHz are for a data link. The CRC can be used to check for errors and validate framing. A receiving end of a communications channel searches for the framing bit pattern, 001011, and checks the CRC for errors. The concept of the ESF format permits real time checking for errors on a T1 channel. Further, the data link allows sending maintenance information over the ESF framing channel.

The TDM channel bank and digital line transmission equipment timing recovery circuits are known to have a ones-bit density requirement. Because of equipment, such as repeaters, used in the T1 network, no more than 15 consecutive 0-bits are to be sent serially in a data bit sequence, without at least "one" 1-bit. Additionally, in each and every window of 8X(n'+1) bits, where n' can equal 1 through 23, there must be at least n' 1-bits present.

Two conditions that indicate transmission failure are red alarm and yellow alarm. A red alarm, for example, may result from loss of signal, having the ones density low, or a loss of framing bits. In response to the red alarm, a TDM channel bank cuts off all twenty-four channels to prevent a situation where, for example, channel 1 may be communicating with channel 19. These channels are also "made busy" to prevent a switch or user from accessing a faulty circuit. Further, if there is a red alarm detected in a channel bank or terminal device, the equipment will send a yellow alarm to the opposite direction.

Yellow alarm can be sent using two different formats, and sometimes both formats are sent simultaneously. In the superframe format, the yellow alarm is manifested by forcing the second bit in every eight bit byte to a zero bit. This creates problems for data applications, and therefore, this method of communicating yellow alarm is not effective. If a customer sends a signal of bit 2 as a zero bit in all bytes, then yellow alarm will be detected falsely by the receiving device. This falsely indicates that the far end is in red alarm and the terminal will interrupt service.

The second format for sending yellow alarm is in the ESF EOC. The 4 kHz data link in the EOC (193d bit location) is used to communicate yellow alarm. It does this by sending a continuous pattern of 8 ones followed by 8 zeros.

At a transmitter end of a DS-1 circuit a line interface unit (LIU) generates the framing bits, check bits for the CRC, and if required a "yellow alarm" in the data link. At the receive end of the DS-1 circuit a LIU examines the CRC for errors. As shown in FIG. 2, a prior LIU 121 is connected to a prior transmitter unit (TU) 122, and a prior receiver unit (RU) 123. An alarm control unit (ACU) 124 is connected to the prior RU 123 and to the prior TU 122. Errors detected at one end of a DS-1 channel in the T1 network are communicated over the 4 kHz, ESF framing channel to the opposite end using the EOC.

The prior TU 122 converts data from the channel bank to a 1.544 Mbps signal to be sent over the DS-1 network in the superframe format. The prior LIU 121 converts the superframe formatted data from the prior TU 122 to the ESF format, and sends the ESF signal over the DS-1 transmission path.

In a receive mode, the prior LIU 121 converts the received ESF signal to superframe formatted data. The prior LIU 121 receiver detects yellow alarm on the ESF EOC, as a message in the EOC of the ESF framing channel. The prior RU 123 converts the 1.544 Mbps superframe formatted data to channelized data. The prior RU 123 also detects yellow alarm in the SF format, namely, detecting that the second bit in every byte is a zero bit. The prior RUs communicate receive signal failure (RFAL) to the associated prior LIU and ACU when the "bit 2 equals zero" pattern is received.

As previously mentioned, a problem with prior LIUs is that if a customer sends bit 2 as a zero bit in every byte, then yellow alarm is detected by the receiver unit. A problem further exists with prior RUs and prior LIUs. Those currently being manufactured by AT&T and others, for example, have all back plane wire connections from each of the pair of RUs associated with a prior LIU, utilized. A particular connection is used with prior RUs and prior LIUs to communicate receive signal failure (RFAL) from the prior RU to the prior LIU and ACU (see FIG. 2). This particular back plane connection from each of two prior RUs to the prior LIU is not utilized. However on replacement LIUs that convert the superframe format to the ESF format, such as the Verilink LIU3, the replacement LIUs detect RFAL condition, and accordingly do not require a RFAL signal from the prior RUs.

As illustratively shown in FIG. 3, the prior RU 123 is connected to the prior LIU 121 through external connection 57, for communicating the RFAL signal from the prior RU 123 to the prior LIU 121. This is because the RFAL condition is detected on the prior RU 123 from the DS-1 formatted data. A replacement LIU, however, does not require the RFAL signal from the prior RU, since the replacement LIU itself detects the RFAL condition as well as the yellow alarm. Thus, the external connection 57 is not used with replacement LIUs.

The replacement LIUs detect yellow alarm both in the ESF format and in the superframe formatted data.

OBJECTS OF THE INVENTION

An object of the invention is to eliminate sensitivity to bit two equal zero bit data conditions of any duration to allow clear channel capability. This removes the restriction on user data that prohibits transmitting "bit 2 equal to a zero bit."

Another object of the invention is to communicate one of three conditions from a replacement-line-interface unit to a replacement-receiver unit using only one back plane connection from the line interface unit to each receiver unit. "In service equipment," thus does not have to be rewired and suffer being, taken "out of service." Otherwise, potential solutions would involve changing or modifying ACU plugs and adding wiring to the equipment shelves. The three conditions are: (1) when the replacement LIU is optioned for the superframe format, the replacement-receiver unit should allow bit 2 equals zero yellow alarm to be communicated via a yellow alarm condition (RNB2) to the ACU; (2) when the replacement LIU is optioned for the ESF format, and no yellow alarm is present on the EOC, the RNB2 signal from the replacement-receiver unit should be blocked at the replacement-receiver unit and replaced with a logic zero bit; and, (3) when the replacement LIU is optioned for the ESF format, and a yellow alarm message is being received via the EOC, then the replacement-receiver unit's RNB2 signal should be blocked because it does not respond to a "bit 2 equal zero" yellow alarm. In this condition, an artificial RNB2 yellow alarm signal must be sent to the ACU from the replacement-receiver unit in response only to the EOC yellow alarm.

Another object of the invention is, to permit, if a prior-line-interface unit is used, then the RFAL condition detected on the prior-receiver unit or replacement-receiver unit to be sent from the prior-receiver unit or a replacement-receiver unit to the prior-line-interface unit, using the same back plane connection.

A further object of the invention is a retrofit to LIUs and RUs which requires no wiring modification to the back panel, no option selection jumpers or switches, and no external programming required on either the LIU or RU, regardless if the complimentary unit is a prior or replacement unit.

A still further object of the invention is a circuit which allows prior LIUs and replacement LIUs to be used interchangeably with prior RUs and replacement RUs, with no option selection required on either a LIU or a RU.

Another object of the invention is low cost for the retrofit circuit on the RU and LIU.

SUMMARY OF THE INVENTION

According to the present invention, as embodied and broadly described herein, a retrofit circuit for superframe channel banks is provided comprising status means and comparator means. Status means may be embodied as a status circuit which uses a first resistor and a second resistor. The retrofit circuit communicates one of three conditions from a LIU to a RU, using only one external connection between the LIU and the RU. A common ground is assumed between all units. A received signal on the LIU from the T1 network, is either ESF or SF formatted. The LIU can have a detection circuit and status circuit which outputs a first status signal which may be a first voltage level, e.g. +5 volts, at an external connection when a received signal is ESF with no yellow alarm. The detection and status circuit output a second status signal which may be a second voltage level, e.g. +2.5 volts, at the external connection when the received signal is ESF with yellow alarm, but the SF format does not have bit two equal a zero bit. The detection and status circuit output a third status signal which may be a third voltage level, e.g. 0 volts, at the external connection when the received signal has ESF with yellow alarm and SF format with bit two equal a zero bit (B2=0) for all received bytes.

The comparison means has a first threshold and a second threshold and is located on the RU. The comparison means outputs a first output signal at a first output terminal and a third output signal at a second output terminal when it detects that the first voltage level at the external connection is above the first threshold. The comparison means outputs a second output signal at the first output terminal and a third output signal at the second output terminal when it detects that the second voltage level at the external connection is between the first threshold and the second threshold. The comparison means outputs a second output signal at the first output terminal and a fourth output signal at the second output terminal when it detects that the third voltage level at the external connection is below the second threshold.

A diode or transistor or other low impedance device is located on the RU and is connected between the external connection and an output of a receiver-fail circuit for passing a RFAL signal to the external connection.

Additional objects and advantages of the invention will be set forth in part in the description which follows, and in part will be obvious from the description, or may be learned by practice of the invention. The objects and advantages of the invention also may be realized and attained by means of the instrumentalities and combinations particularly pointed out in the appended claims.

BRIEF DESCRIPTION OF THE DRAWINGS

The accompanying drawings, which are incorporated in and constitute a part of the specification, illustrate preferred embodiments of the invention, and together with the description serve to explain the principles of the invention.

FIG. 3 shows the back panel interconnection of the RU, ACU and LIU;

FIG. 4 is a conceptual block diagram of the retrofit circuits according to the present invention;

FIG. 6 is a chart showing the outputs of comparators for the retrofit circuit of FIG. 5;

FIG. 8 is a chart showing the outputs of comparators for the retrofit circuit of FIG. 7.

DETAILED DESCRIPTION OF THE PREFERRED EMBODIMENTS

Figures 1, 2:
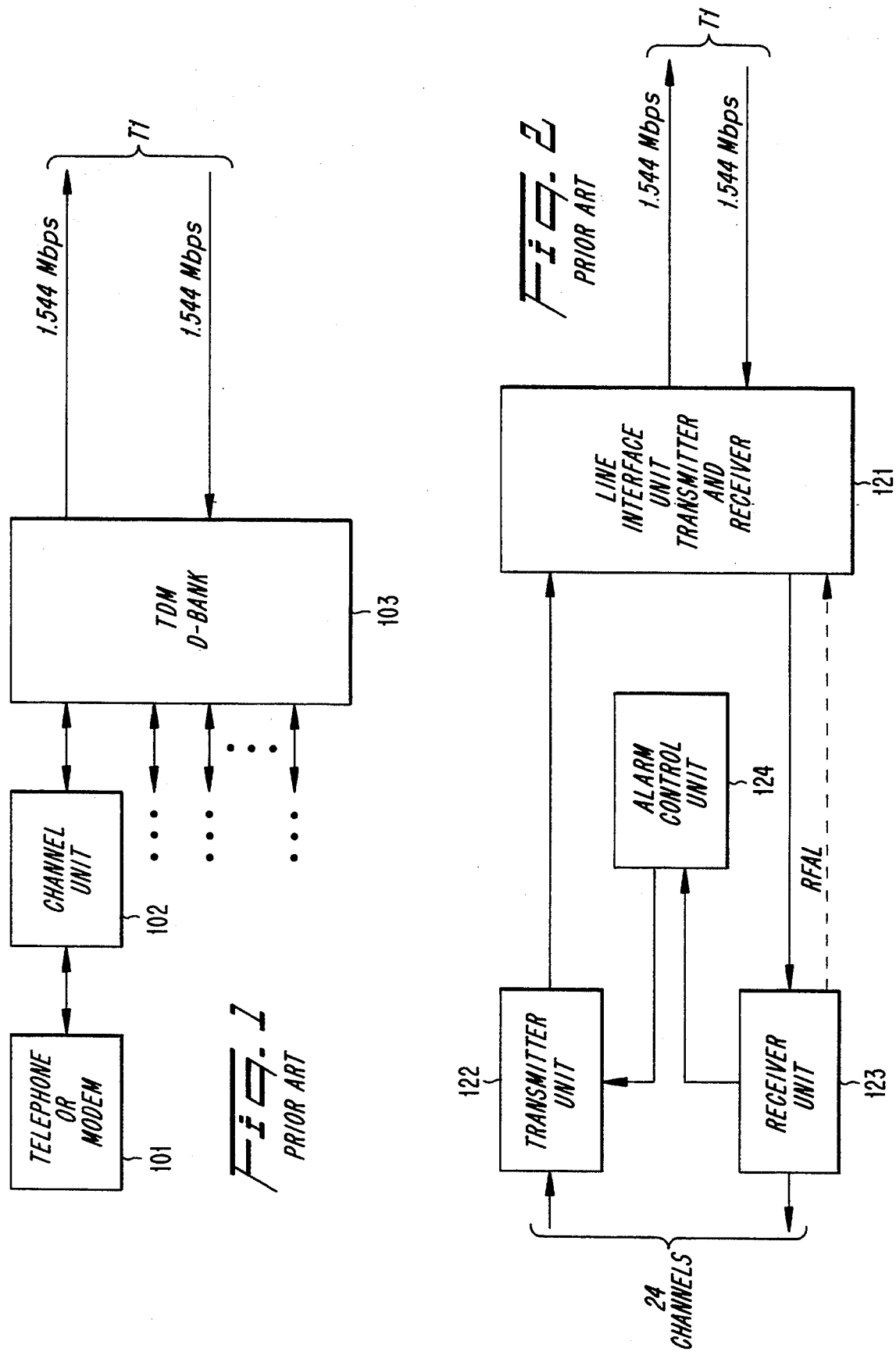
FIG. 1 is a block diagram of a telephone interconnected through a channel unit in a TDM channel bank to the DS-1 network.
FIG. 2 is a partial block diagram of the TDM channel bank common equipment including a TU, RU, ACU and LIU interconnected thereto.

Reference will now be made in detail to the present preferred embodiments of the invention, examples of which are illustrated in the accompanying drawings, wherein like reference numerals indicate like elements throughout the several views.

As illustratively shown in FIG. 4, a retrofit circuit for TDM channel banks is provided comprising status means and comparator means. Status means may be embodied as a first resistor R1 and a second resistor R2. The comparison means, by way of example, may be embodied as a voltage comparator having a first threshold and a second threshold. In a preferred embodiment as shown in FIG. 4, the first threshold is set at +3.75 volts and the second threshold is set at +1.25 volts.

The retrofit circuit communicates one of three conditions from a LIU to a RU, using only one external connection 33 between the LIU and the RU. A received signal being processed on the LIU from the DS-1 network can receive ESF or SF formatted data. The LIU has a detection circuit, referred to in FIG. 4, as a large scale integrated (LSI) circuit processor, but may be constructed from a plurality of integrated circuits, discrete components or equivalent circuits. The detection circuit detects the ESF yellow alarm in the ESF framing channel, and detects the bit two equal a zero bit in the SF formatted signal.

The detection circuit outputs a first input signal, e.g. +5 volts, at a first terminal 75 in response to detecting that the received signal has ESF and no yellow alarm. The detection circuit outputs a second input signal, e.g. 0 volts, at the first terminal 75 in response to detecting that the received signal has ESF and yellow alarm. The first input signal and the second input signal may be embodied as a one bit and a zero bit, respectively, having values of +5 volts and 0 volts. The detection circuit outputs a third input signal, e.g. +5 volts, at a second terminal 85 when the received signal has SF format with no yellow alarm. The detection outputs a fourth input signal, e.g. 0 volts, at the second terminal 85 in response to detecting that the signal has SF format with bit two set to a zero bit, the D4 yellow alarm. The third input signal and the fourth input signal may be embodied as a one bit and a zero bit, respectively, having values of +5 volts and 0 volts.

Status means is located on the LIU and is coupled to the first terminal 75 and to the second terminal 85. The status means outputs a first status signal, e.g. a voltage level of +5 volts, to the external connection 33 in response to the first input signal, +5 volts, being applied at the first terminal 75 and the third input signal, +5 volts, being applied at the second terminal 85. The status means outputs a second status signal, +2.5 volts, to the external connection 33 in response to the second input signal, +5 volts, being applied at the first terminal 75 and the third input signal, 0 volts, being applied at the second terminal 85. The status means outputs a third status signal, 0 volts, at the external connection 33 in response to the second input signal, 0 volts, being applied at the first terminal 75 and the fourth input signal, 0 volts, being applied at the second terminal 85.

The status signal may be any type of signal, including a phase-shift-keyed (PSK) signal, a frequency-shift-keyed (FSK) signal, an amplitude-shift-keyed (ASK) signal, or any combination thereof. In a preferred embodiment, the status signal is considered an ASK signal, having a first voltage level of +5 volts, a second voltage level of +2.5 volts, and a third voltage level of 0 volts. More particularly, the status means may be embodied as first resistor R1 and second resistor R2 connected as shown in FIG. 4. Other circuits would be used if the status signal were embodied as a PSK or FSK signal.

In the exemplary arrangement shown in FIG. 4, the first resistor R1 is located on the LIU and is connected between first terminal 75 and the external connection 33. The second resistor R2 is located on the LIU and is connected between second terminal 85 and the external connection 33. The first resistor R1 and the second resistor R2 output the first status signal as a first voltage level, for example +5 volts, at the external connection 33 in response to the detection circuit applying the first input signal, +5 volts at first terminal 75 and the third input signal, +5 volts at second terminal 85. This could correspond to when the received signal is ESF with no yellow alarm.

The first resistor R1 and the second resistor R2 output the second status signal as a second voltage level, for example +2.5 volts, in response to the detection circuit applying the first input signal, +5 volts, at the first terminal 75 and the fourth input signal, 0 volts, at the second terminal 85. This could occur when the received signal is ESF with no yellow alarm, but the SF format has bit two equal a zero bit. The first resistor R1 and the second resistor R2 also output the second status signal as the second voltage level, +2.5 volts, when the detection circuit applies the second input signal, 0 volts, at the first terminal 75 and the third input signal, +5 volts, at the second terminal 85. This could occur when the received signal is ESF with yellow alarm, but the SF format does not have two equal a zero bit.

The first resistor R1 and the second resistor R2 output the third status signal as a third voltage level, for example 0 volts, at the external connection 33 in response to the detection circuit applying the second input signal, 0 volts at first terminal 75 and the fourth input signal, 0 volts at second terminal 85. This would occur when the received signal has ESF with yellow alarm, and SF format with bit two equal a zero bit.

The comparison means is located on the RU. The comparison means outputs a first output signal at a first output terminal and a third output signal at a second output terminal in response to detecting the first status signal at the external connection. The comparison means outputs a second output signal at the first output terminal and a third output signal at the second output terminal in response to detecting the second status signal at the external connection. The comparison means outputs a second output signal at the first output terminal and a fourth output signal at the second output terminal in response to detecting the third status signal at the external connection. More particularly, the comparison means may be embodied as a voltage comparator as shown in FIG. 4.

The voltage comparator has a first threshold, shown as set at +3.75 volts, and a second threshold shown as set at +1.25 volts, and is located on the RU. The voltage comparator outputs a first output signal, e.g. +5 volts, at a first output terminal 76 and a third output signal, e.g. +5 volts, at a second output terminal 86 in response to detecting that the first voltage level, +5 volts, at the external connection 33 is above the first threshold, +3.75 volts. The voltage comparator outputs a second output signal, 0 volts, at the first output terminal 76 and a third output signal, +5 volts at the second output terminal 86 in response to detecting that the second voltage level, +2.5 volts, at the external connection 33 is between the first threshold, +3.75 volts and the second threshold, +1.25 volts. The voltage comparator outputs a second output signal, 0 volts, at the first output terminal 76 and a fourth output signal, 0 volts, at the second output terminal 86 in response to detecting that the third voltage level, 0 volts, at the external connection 33 is below the second threshold, +1.25 volts.

Rectifying means embodied as a diode D1 or transistor or other equivalent device having a low impedance in one direction and a high impedance in reverse direction, is located on the RU and is connected between the external connection 33 and an output of a receiver-fail circuit for passing a RFAL signal to the external connection. First capacitor C1 suppresses noise.

Figure 5:
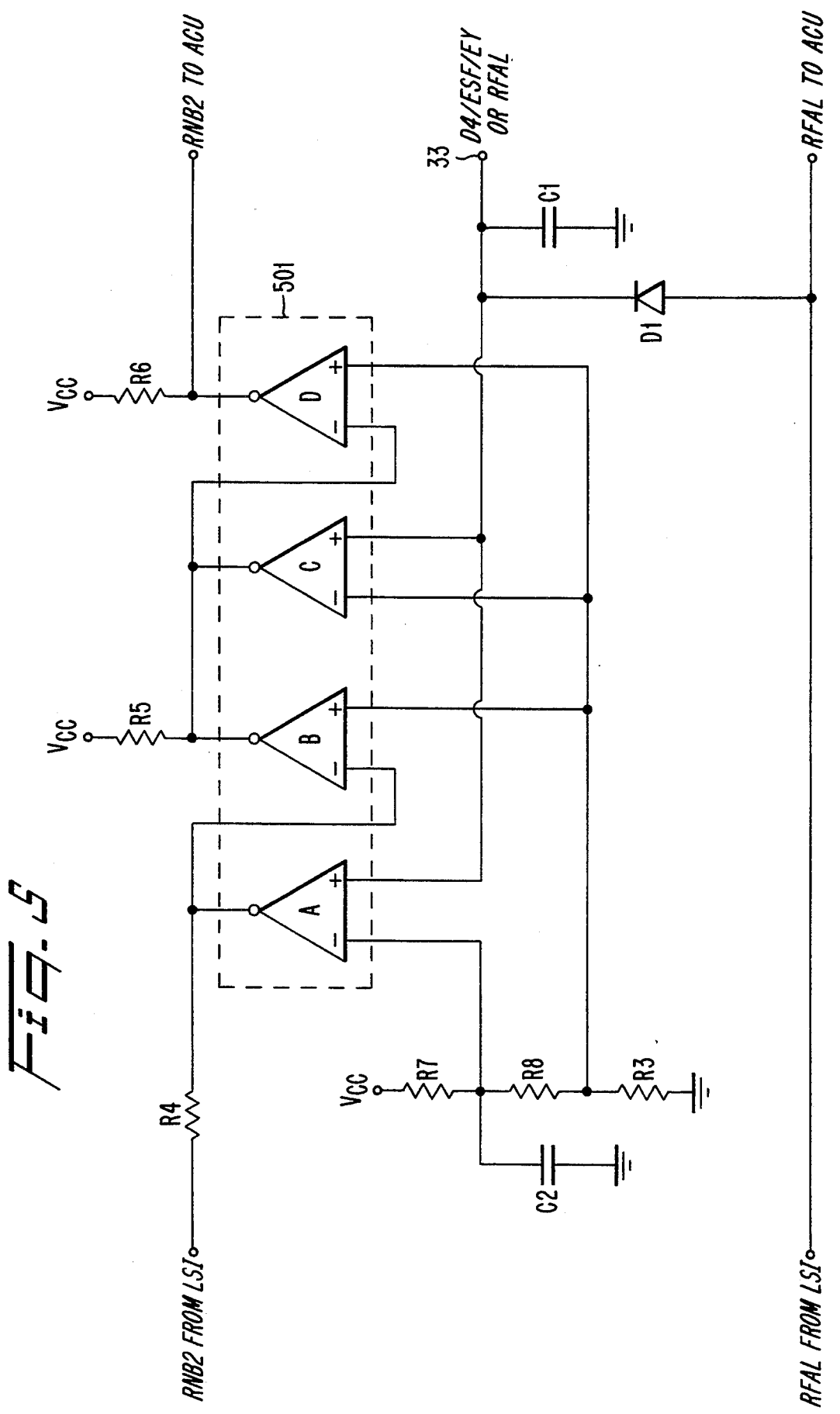
FIG. 5 is a detailed circuit diagram of a retrofit circuit according to the present invention for the RU.

In the exemplary arrangement shown in FIG. 5, a preferred embodiment of the retrofit circuit is shown as implemented on a RU. The voltage comparator in embodied with a quad comparator 501, which, by way of example, may be a LM339. The supply voltage, Vcc, is set at +5 volts, and the voltage divider, which comprises third resistor R3, seventh resistor R7 and eighth resistor R8, sets the first threshold and the second threshold. With seventh resistor R7 at 1K, eighth resistor R8 at 2K and third resistor R3 at 1K, the first threshold is set at +3.75 volts and is applied to the negative input of comparator A of quad comparator 501. The second threshold is set at +1.25 volts and is applied to the negative input of comparator C of quad comparator 501. Second capacitor C2, for example, may be 0.1 microfarad for transient and noise suppression.

As an example of particular values of components which will work with the present invention, the fourth resistor R4, fifth resistor R5, and sixth resistor R6 may each be set at 4.7K. The diode D1 can be a 1N4148 or a transistor or other equivalent device and first capacitor C1 can have a value of 0.001 microfarads.

FIG. 6 illustrates the outputs of comparators A, B, C, and D of quad comparator 501, for the retrofit circuit of FIG. 5, for the first voltage level, second voltage level and third voltage level having values of +5 volts, +2.5 volts and 0 volts, respectively.

Figure 7:
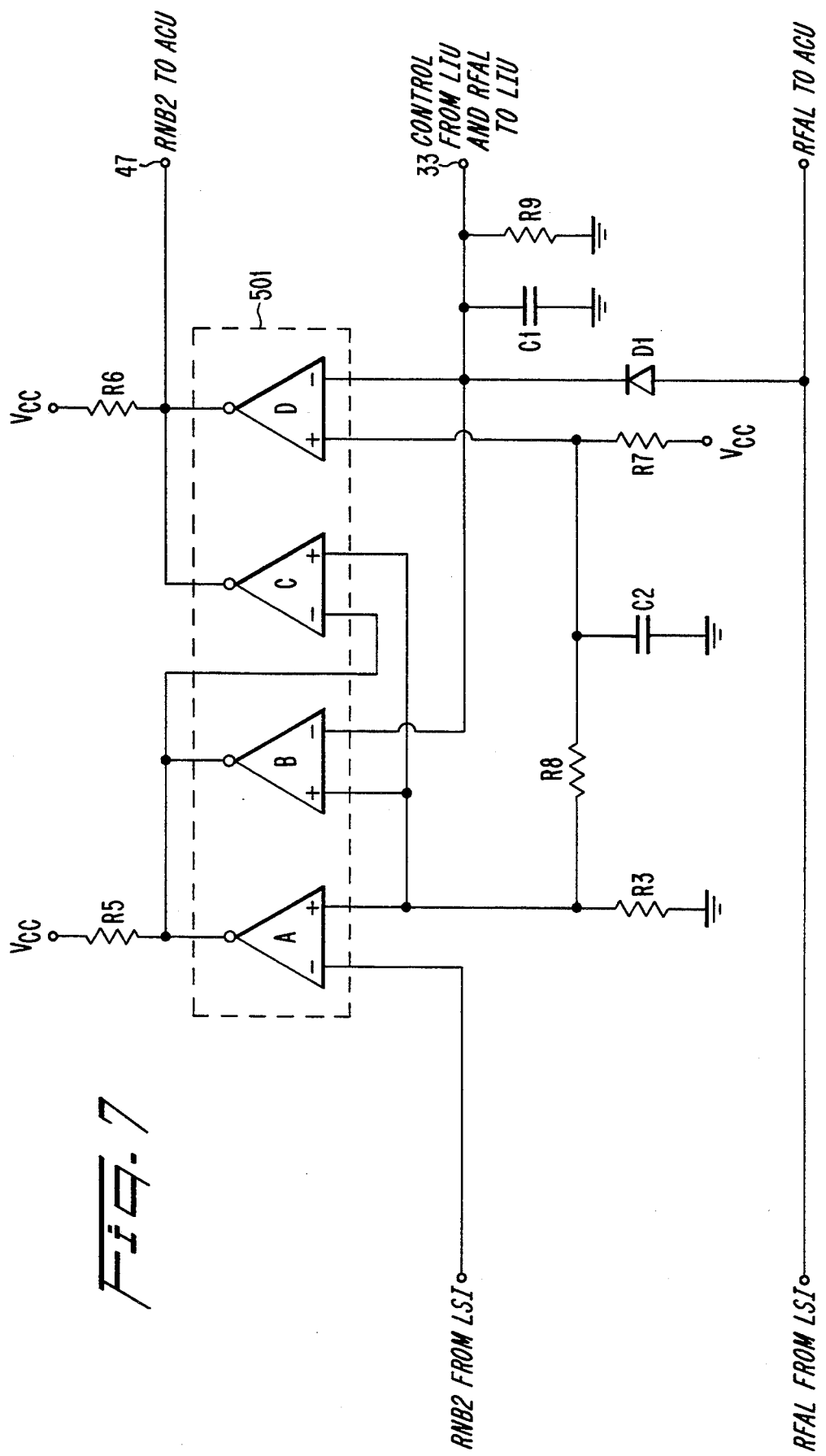
FIG. 7 is a detailed circuit diagram of a retrofit circuit according to the present invention for the RU.

FIG. 7 shows another preferred embodiment of the retrofit circuit, which is similar to the retrofit circuit of FIG. 5. A ninth resistor R9 has been added across first capacitor C1. The ninth resistor R9 might have a value of 100K. FIG. 8 illustrates the outputs of comparators A, B, C and D of quad comparator 501, for the retrofit circuit of FIG. 7.

In the prior art, an existing back plane, external connection 33, from a replacement RU to a replacement LIU, is not utilized, as in the Verilink LIU3. The external connection 33 for the prior LIU and prior RU normally was an output from the prior RU to the prior LIU to communicate receive signal failure (RFAL). The replacement LIU detects RFAL condition on the replacement LIU, and therefore, does not require use of the external connection 33 used by the prior RU and prior LIU. When a prior LIU, such as an AT&T or compatible LIU, is used, the external connection 33 is required for proper bank alarm processing, regardless whether a prior RU or replacement RU is used.

One of three conditions is communicated from a replacement-line-interface unit to a replacement-receiver unit using only one back plane connection from the line interface unit to each receiver unit. The three conditions are: (1) for the SF format, the replacement-receiver unit should allow its normal second bit when equal to a 0-bit (RNB2) alarm to pass through to the ACU; (2) for the ESF format, and no yellow alarm is present on the EOC, then the RNB2 signal from the replacement-receiver unit should be blocked at the replacement-receiver unit and replaced with a logic 0-bit; and, (3) for the ESF format, and yellow alarm message is being received via the EOC, then the replacement-receiver unit's RNB2 signal should be blocked because it probably does not contain a bit two equals zero yellow alarm. In the latter condition, an artificial RNB2 yellow alarm signal must be sent to the ACU from the replacement-receiver unit.

Note that these three conditions are detected with the detection circuit on the replacement LIU, such as the Verilink LIU3. The retrofit circuit of the present invention outputs these three conditions from the replacement LIU to the RU.

In addition to these three conditions communicating from the replacement LIU to the RU, a fourth condition is required to be carried on the same back plane external connection 33. If a prior LIU, such as a Western Electric LIU, is used, then the RFAL condition, which is detected on the prior RU and replacement RU, is sent from the RU to the LIU. A prior LIU, such as a AT&T LIU, will input the RFAL signal and process it. A replacement LIU, such as the Verilink LIU, however, must ignore the RFAL signal and not suffer from bus contention problems.

The bi-directional use of a single available external connection 33 for passing multiple commands is accomplished inexpensively with the present invention by using a three level, i.e. first voltage level, second voltage level, and third voltage level, soft driver on the replacement LIU and a voltage comparator on the RU. The two bits of information, represented as first input signal, second input signal, third input signal and fourth input signal, each drive a common node, the external connection 33, through first resistor R1 and second resistor R2. The first resistor R1 and second resistor R2 each may have a value of 10K. If both bits are high, then the driver looks like 5K resistance to five volts. If both bits are low, then the driver looks like 5K resistance to ground. If one bit is high and the other bit is low, then the driver looks like 5K to +2.5 volts.

The RU voltage comparator has its second threshold, an upper threshold, set at +3.75 volts and its first threshold, a lower threshold, set at +1.25 volts. These thresholds provide maximum noise immunity for the three valid voltage levels: +0 V, +2.5 V, and +5 V.

The soft, 5K impedance, of the driver allows the use of a first capacitor C1 at the RU for filtering and eliminating noise sensitivity. Since the three valid voltage levels are static DC voltages, no signal suppression should occur. An additional benefit of this soft driver technique is that the RFAL signal may be driven through diode D1 or transistor or other low impedance device from the RU to the LIU. If a replacement LIU, such as a Verilink LIU3, is used, then the 10K resistors isolate this signal from the drivers. If a prior LIU, such as a AT&T LIU, is used, then its input will be pulled up and the prior LIU will process the RFAL alarm state. On the RU, the RFAL detector normally is low, making the diode D1 or other device reverse biased, regardless of the drive voltage from the replacement LIU. When the RFAL goes high, then the diode D1 pulls the line high and the window comparator with it. Since the voltage comparator high state corresponds to the D2 format alarm mode, all normal D4 format failure functions will operate. Yellow alarm is not used during a RFAL, from a loss of signal or out-of-frame condition.

Accordingly, the present invention allows total flexibility in use of prior LIUs, prior RUs, replacement LIUs, and replacement RUs, without requiring any option selection switches or jumpers.

On replacement LIUs, such as the Verilink LIU3, the detection of yellow alarm is accomplished by a microprocessor. Two bits of output drive the first resistor R1 and the second resistor R2, so that recurring cost is low.

The cost of components to be added to the RUs is modest. The value added nature of this invention allows a reasonable price premium with low recurring costs.

The present invention further includes a method using a retrofit circuit for communicating one of three conditions from a LIU to a RU, using only one external connection between the LIU and the RU. The LIU has a detection circuit which outputs a first input signal at a first terminal in response to a received signal having ESF and no yellow alarm. The detection circuit outputs a second input signal at the first terminal in response to the received signal having ESF and yellow alarm. The detection circuit outputs a third input signal at a second terminal in response to the signal having SF format with no yellow alarm. The detection circuit outputs a fourth input signal at the second terminal in response to the received signal having SF format with yellow alarm.

The method comprises the steps of outputting to an external connection a first status signal in response to the first input signal at the first terminal and the third input signal at the second terminal; outputting to the external connection a second status signal in response to the second input signal at the first terminal and the third input signal at the second terminal; outputting to the external connection a third status signal in response to the second input signal at the first terminal and the fourth input signal at the second terminal; outputting a first output signal at a first output terminal and a third output signal at a second output terminal in response to the first status signal at the external connection; outputting a second output signal at the first output terminal and a third output signal at the second output terminal in response to the second status signal at the external connection; and outputting a second output signal at the first output terminal and a fourth output signal at the second output terminal in response to the third status signal at the external connection.

It will be apparent to those skilled in the art that various modifications can be made to the retrofit circuit of the instant invention with out departing from the scope or spirit of the invention, and it is intended that the present invention cover modifications and variations of the retrofit circuit provided they come within the scope of the appended claims and their equivalents.

I claim:

1. A retrofit circuit for communicating one of three conditions from a line interface unit to a receiver unit, using one external connection between said line interface unit and said receiver unit, said line interface unit having a detection circuit responsive to a received signal on said line interface unit using extended superframe format and with no yellow alarm for outputting a first input signal at a first terminal, responsive to the received signal on said line interface unit using extended superframe format and with yellow alarm for outputting a second input signal at the first terminal, responsive to the received signal on said line interface unit using superframe format and with no yellow alarm for outputting a third input signal at a second terminal, and responsive to the received signal on said line interface unit using superframe format and with yellow alarm for outputting a fourth input signal at the second terminal, comprising:

a first resistor located on said line interface unit connected between the first terminal and said external connection;

a second resistor located on said line interface unit connected between the second terminal and said external connection;

wherein said first resistor and said second resistor responsive to the first input signal at the first terminal and the third input signal at the second terminal output a first voltage level at said external connection, responsive to the second input signal at the first terminal and the third input signal at the second terminal output a second voltage level at said external connection, and responsive to the second input signal at the first terminal and the fourth input signal at the second terminal output a third voltage level at said external connection;

a voltage comparator having a first threshold and a second threshold and located on said receiver unit, responsive to detecting the first voltage level at said external connection above the first threshold for outputting a first output signal at a first output terminal and a third output signal at a second output terminal, responsive to detecting the second voltage level at said external connection between the first threshold and the second threshold for outputting a second output signal at the first output terminal and a third output signal at the second output terminal, responsive to detecting the third voltage level at said external connection below the second threshold for outputting a second output signal at the first output terminal and a fourth output signal at the second output terminal; and rectifying means located on said receiver unit connected between said external connection and an output of a receiver-fail circuit, responsive to the received signal on said line interface unit using superframe format and with yellow alarm, for passing a receive signal failure signal to said external connection.

2. A retrofit circuit for communicating one of three conditions from a line interface unit to a receiver unit, with an external connection between said line interface unit and said receiver unit, said line interface unit having a detection circuit responsive to a received signal on said line interface unit using extended superframe format and with no yellow alarm for outputting a first input signal at a first terminal, responsive to the received signal on said line interface unit using extended superframe format and with yellow alarm for outputting a second input signal at the first terminal, responsive to the received signal on said line interface unit using superframe format and with no yellow alarm for outputting a third input signal at a second terminal, and responsive to the received signal on said line interface unit using superframe format and with yellow alarm for outputting a fourth input signal at the second terminal, comprising:

status means responsive to the first input signal at the first terminal and the third input signal at the second terminal for outputting a first status signal at said external connection, responsive to the second input signal at the first terminal and the third input signal at the second terminal for outputting a second status signal at said external connection, and responsive to the second input signal at the first terminal and the fourth input signal at the second terminal for outputting a third status signal at said external connection; and comparator means having a first threshold and a second threshold, responsive to the first status signal at said external connection exceeding the first threshold for outputting a first output signal at a first output terminal and a third output signal at a second output terminal, responsive to the second status signal at said external connection between the first threshold and the second threshold for outputting a second output signal at the first output terminal and a third output signal at the second output terminal, and responsive to the third status signal at said external connection below the second threshold for outputting a second output signal at the first output terminal and a fourth output signal at the second output terminal.

3. A retrofit circuit comprising:

status means responsive to a first input signal at a first terminal and a third input signal at a second terminal for outputting a first status signal at an external connection, responsive to a second input signal at the first terminal and the third input signal at the second terminal for outputting a second status signal at the external connection, responsive to the first input signal at the first terminal and a fourth input signal at the second terminal for outputting the second status signal, and responsive to the second input signal at the first terminal and the fourth input signal at the second terminal for outputting a third status signal at the external connection; and comparator means having a first threshold and a second threshold, responsive to the first status signal at the external connection exceeding the first threshold for outputting a first output signal at a first output terminal and a third output signal at a second output terminal, responsive to the second status signal at the external connection between the first threshold and the second threshold for outputting a second output signal at the first output terminal and a third output signal at the second output terminal, and responsive to the third status signal at the external connection below the second threshold for outputting a second output signal at the first output terminal and a fourth output signal at the second output terminal.

4. The retrofit circuit as set forth in claim 3 further including rectifying means connected between the external connection and an output of a receiver-fail circuit, responsive to the first input signal at the first terminal and the fourth input signal at the second terminal, for passing a receive signal failure signal to the external connection.

5. A method using a retrofit circuit for communicating one of three conditions from a line interface unit to a receiver unit, using an external connection between said line interface unit and said receiver unit, said line interface unit having a detection circuit responsive to a communication signal using extended superframe format and with no yellow alarm for outputting a first input signal at a first terminal, responsive to the communication signal using extended superframe format and with yellow alarm for outputting a second input signal at the first terminal, responsive to the communication signal using superframe format and with no yellow alarm for outputting a third input signal at a second terminal, and responsive to the communication signal using superframe format and with yellow alarm for outputting a fourth input signal at the second terminal, comprising the steps, using said retrofit circuit, of:

outputting to the external connection a first status signal in response to the first input signal at the first terminal and the third input signal at the second terminal;

outputting to the external connection a second status signal in response to the second input signal at the first terminal and the third input signal at the second terminal;

outputting to the external connection a third status signal in response to the second input signal at the first terminal and the fourth input signal at the second terminal;

outputting a first output signal at a first output terminal and a third output signal at a second output terminal connection;

outputting a second output signal at the first output terminal and a third output signal at the second output terminal in response to the second status signal at the external connection; and outputting a second output signal at the first output terminal and a fourth output signal at the second output terminal in response to the third status signal at the external connection.

* * * * *